United States Patent
Sato

(10) Patent No.: US 10,415,966 B2
(45) Date of Patent: Sep. 17, 2019

(54) MAP GENERATING DEVICE, MAP GENERATING METHOD, AND PROGRAM RECORDING MEDIUM

(71) Applicant: NEC Corporation, Minato-ku, Tokyo (JP)

(72) Inventor: Yoshiaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 73 days.

(21) Appl. No.: 15/561,609

(22) PCT Filed: Apr. 11, 2016

(86) PCT No.: PCT/JP2016/062188
§ 371 (c)(1),
(2) Date: Sep. 26, 2017

(87) PCT Pub. No.: WO2016/163563
PCT Pub. Date: Oct. 13, 2016

(65) Prior Publication Data
US 2018/0120106 A1    May 3, 2018

(30) Foreign Application Priority Data
Apr. 9, 2015  (JP) .................................. 2015-080164

(51) Int. Cl.
*G06T 17/00*  (2006.01)
*G01C 11/06*  (2006.01)
(Continued)

(52) U.S. Cl.
CPC .............. *G01C 11/06* (2013.01); *G01C 21/20* (2013.01); *G05D 1/0234* (2013.01);
(Continued)

(58) Field of Classification Search
CPC ...... G01C 11/06; G01C 21/20; G01C 151/06; G06T 7/73; G06T 17/05;
(Continued)

(56) References Cited

U.S. PATENT DOCUMENTS

| 2006/0293810 | A1 | 12/2006 | Nakamoto |
| 2007/0091125 | A1* | 4/2007 | Takemoto ................. G06T 7/80 345/633 |
| 2015/0192774 | A1 | 7/2015 | Watanabe et al. |

FOREIGN PATENT DOCUMENTS

| JP | H09-21639 | 1/1997 |
| JP | 2006-214832 A | 8/2006 |

(Continued)

OTHER PUBLICATIONS

International Search Report for PCT Application No. PCT/JP2016/062188, dated Jun. 21, 2016.
(Continued)

*Primary Examiner* — Ping Y Hsieh

(57) ABSTRACT

An identification unit obtains a plurality of photographic images including two or more markers. The makers are placed on a different object, respectively. The identification unit identifies, from the plurality of photographic images thus obtained, three-dimensional positions of the two or more markers. A generating unit transforms coordinate system of the plurality of photographic images into a common coordinate system. Relative positions of the two or more markers based on a specific location are indicated in the common coordinate system. The generating unit generates map data which associates the positions of the two or more markers.

8 Claims, 12 Drawing Sheets

(51) Int. Cl.
*G06T 17/05* (2011.01)
*G06T 7/73* (2017.01)
*G05D 1/02* (2006.01)
*G01C 21/20* (2006.01)
*G09B 29/00* (2006.01)
*B65G 1/137* (2006.01)
*G01C 15/06* (2006.01)
*B25J 9/16* (2006.01)

(52) U.S. Cl.
CPC .............. *G05D 1/0274* (2013.01); *G06T 7/73* (2017.01); *G06T 17/05* (2013.01); *G09B 29/004* (2013.01); *B25J 9/1697* (2013.01); *B65G 1/137* (2013.01); *G01C 15/06* (2013.01); G05D 1/0246 (2013.01); G05D 2201/0216 (2013.01); *G06T 2207/10016* (2013.01); *G06T 2207/20048* (2013.01); *G06T 2207/30204* (2013.01)

(58) Field of Classification Search
CPC . G06T 2207/10016; G06T 2207/20048; G06T 2207/30204; G05D 1/0234; G05D 1/0274; G05D 1/0246; G05D 2201/0216; G09B 29/004; B25J 9/1697
See application file for complete search history.

(56) References Cited

FOREIGN PATENT DOCUMENTS

| | | | |
|---|---|---|---|
| JP | 2006-346767 A | | 12/2006 |
| JP | 2007-229246 A | | 9/2007 |
| JP | 2012-041099 A | | 3/2012 |
| JP | 2013141049 | * | 7/2013 |
| JP | 2014-122075 A | | 7/2014 |
| JP | 2015-060241 A | | 3/2015 |
| WO | 2011/118282 A1 | | 9/2011 |

OTHER PUBLICATIONS

English translation of Written opinion for PCT Application No. PCT/JP2016/062188.

* cited by examiner

Fig. 12

| RANK | PAIR OF MARKERS | | NUMBER OF IDENTIFICATIONS | ADDITION FLAG |
|---|---|---|---|---|
| 1 | $A_3$ | $A_4$ | 1000 | 0 |
| 2 | $A_4$ | $A_5$ | 980 | 0 |
| 3 | $A_2$ | $A_3$ | 500 | 0 |
| 4 | $A_1$ | $A_2$ | 432 | 0 |
| 5 | $A_5$ | $A_6$ | 398 | 0 |
| 6 | $A_6$ | $A_7$ | 357 | 0 |
| 7 | $A_1$ | $A_7$ | 18 | 0 |
| 8 | $A_1$ | $A_3$ | 9 | 0 |
| 9 | $A_3$ | $A_x$ | 1 | 0 |

MAP GENERATING DEVICE, MAP GENERATING METHOD, AND PROGRAM RECORDING MEDIUM

This application is a National Stage Entry of PCT/JP2016/062188 filed on Apr. 11, 2016, which claims priority from Japanese Patent Application 2015-080164 filed on Apr. 9, 2015, the contents of all of which are incorporated herein by reference, in their entirety.

TECHNICAL FIELD

The present invention relates to generating a map through the use of a plurality of markers.

BACKGROUND ART

PTL 1 discloses a technique for detecting a spatial position of a moving object. PTL 2 discloses a mobile robot that calculates the self-position based on markers. In the technique described in PTL 2, positional information and identification information regarding markers placed at predetermined locations are stored in association with map information, and the mobile robot calculates its self-position using this map information.

PTL 3 discloses a system that supports picking operations based on identifiers attached on shelves in a warehouse or similar place. PTL 4 discloses a technique by which two or more markers are captured in an image during imaging, and three or more radiation images having an overlapped area are combined together.

CITATION LIST

Patent Literature

[PTL 1] Japanese Patent Application Publication No. 1997-021639
[PTL 2] Japanese Patent Application Publication No. 2006-346767
[PTL 3] Japanese Patent Application Publication No. 2012-041099
[PTL 4] Japanese Patent Application Publication No. 2007-229246

SUMMARY OF INVENTION

Technical Problem

In each of the techniques described in PTL 2 and PTL 3, a position is identified based on information equivalent to a map that is stored in advance. In the technique described in PTL 4, images on the same plane are combined, which represents two-dimensional processing.

In contrast, an object of the present invention is to make it possible to easily generate map data that contributes to identifying a three-dimensional position.

Solution to Problem

An aspect of the present invention is a map generation device. The map generating device includes identification means and generating means. The identification means that identifies, by using a captured image including two or more markers, coordinates information that represents a relative positional relation between or among the two or more markers in a three-dimensional manner, as well as identifying the identification information for identifying each of the two or more markers. The two or more makers are the makers in a plurality of markers disposed at positions different from one another, and each of the plurality of markers includes recorded identification information for identifying each of the markers. The generation means that generates, based on the identified coordinates information and identification information, map data in which positions of the plurality of markers are associated with the identification information. In other words, the identification means identifies the coordinates information and the identification information from each of a plurality of captured images. Each of the captured images includes two or more markers, and each of the plurality of markers is included in at least one of the captured images. The generation means generates the map data by transforming each of coordinates identified from the plurality of captured images into a coordinate in a common coordinate system that is based on a particular position.

An aspect of the invention is a map generation method. The map generation method includes processing of identifying, by using a captured image including two or more markers, coordinates information that represents a relative positional relation between or among the two or more markers in a three-dimensional manner, as well as identifying the identification information for identifying each of the two or more markers. The two or more makers are the makers in a plurality of markers disposed at positions different from one another, and each of the plurality of markers includes recorded identification information for identifying each of the markers. The processing is performed on a plurality of captured images. Each of the plurality of markers is included in at least one of the plurality of captured images. The method further includes processing of generating, based on the identified coordinates information and identification information. The map data in which positions of the plurality of markers are associated with the identification information, wherein the map data is generated by transforming each of coordinates identified from the plurality of captured images into a coordinate in a common coordinate system that is based on a particular position.

An aspect of the invention is a program recording medium. The program recording medium records a program that causes a computer to execute the processing of identifying, by using a captured image including two or more markers, coordinates information that represents a relative positional relation between or among the two or more markers in a three-dimensional manner, as well as identifying the identification information for identifying each of the two or more markers. The two or more makers are the makers in a plurality of markers disposed at positions different from one another, and each of the plurality of markers includes recorded identification information for identifying each of the markers. The processing is performed on a plurality of captured images. Each of the plurality of markers is included in at least one of the plurality of captured images. The processing further cause the computer to execute the step of generating, based on the identified coordinates information and identification information, map data in which positions of the plurality of markers are associated with the identification information. The map data is generated by transforming each of coordinates identified from the plurality of captured images into a coordinate in a common coordinate system that is based on a particular position.

Advantageous Effects of Invention

The present invention makes it possible to easily generate map data that contributes to identifying a three-dimensional position.

BRIEF DESCRIPTION OF DRAWINGS

FIG. 12 shows an example list (descending order list) containing the number of identifications of each pair.

DESCRIPTION OF EMBODIMENTS

First Example Embodiment

Figure 1:
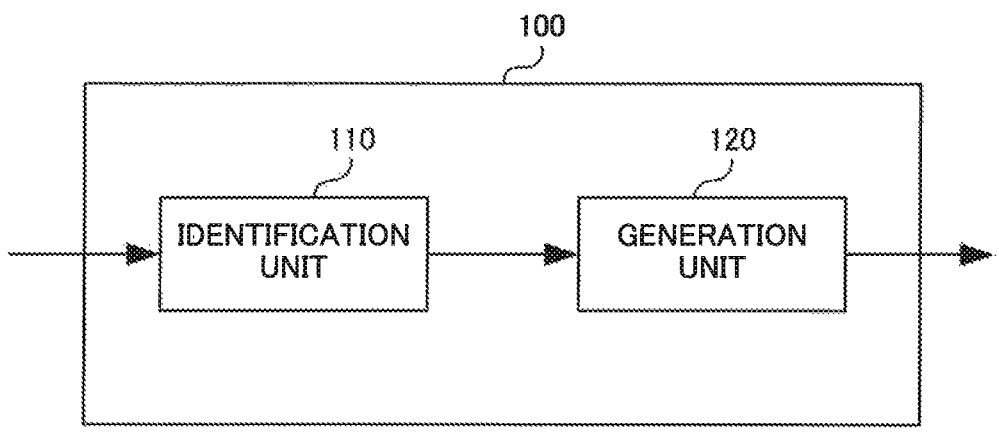
FIG. 1 is a block diagram illustrating an example configuration of a map generation device 100.

FIG. 1 is a block diagram illustrating a configuration of a map generation device 100 according to a first example embodiment of the present invention. The map generation device 100 is an information processing device that includes an identification unit 110 and a generation unit 120. The identification unit 110 and the generation unit 120 are implemented through execution of a predetermined program by an arithmetic processing unit like a central processing unit (CPU). An imaging means (such as an image sensor) that supplies image data or a storage means (such as a hard disk) that stores image data is connected to the map generation device 100.

The map generation device 100 is an information processing device used for generating map data. The map data, as mentioned here, refers to information representing a certain spatial position in a three-dimensional manner, created with a predetermined marker serving as a mark for the position. For this purpose, a plurality of markers are disposed in a predetermined space at positions different from one another.

In addition, every marker is of a predetermined size and shape identification information for identifying the maker is recorded in the maker. The size and shape, as mentioned here, may refer to the size and shape (contour) of an object displayed with the marker, or may refer to the size and shape of a letter or graphic displayed as a marker on the object. For example, the marker according to the present example embodiment may be a display medium of a predetermined size and shape (a paper board, for example) on which the identification information is recorded, or may be a display medium of an indefinite shape on which a marker of a predetermined size and shape is printed or otherwise displayed. It is assumed here that the identification information is a number having a predetermined number of digits.

For example, a marker used for marker-based Augmented Reality (AR), as it is called an AR marker, can be used as the marker according to the present example embodiment. By using an AR marker as the marker, a homogeneous transformation matrix expressing the position and attitude of a marker can be easily obtained from a captured image. Alternatively, a QR Code® or a barcode can be used as the marker according to the present example embodiment.

By using an image that is taken by the imaging means and that contains a marker, the identification unit 110 identifies the coordinates information and identification information regarding the marker. The coordinates information includes at least positional information regarding the marker and information about the attitude of the marker, as expressed in a predetermined coordinate system. The identification unit 110 uses a captured image containing two or more markers within an imaging range to identify the coordinates information that expresses a relative positional relation between or among these markers. The identification unit 110 identifies the coordinates information and identification information on a plurality of captured images.

The identification unit 110 is capable of identifying the distance between the marker and the reference position, based on a difference between the size of the marker in a capture image and its actual size. The reference position, as mentioned here, may be, for example, the position of the imaging means taking the image. The identification unit 110 is also capable of identifying the attitude of a marker, based on a difference (or a distortion) between the shape of the marker in a capture image and its actual shape. Note that the identification unit 110 can identify the distance and attitude regarding a marker by using a known technique.

The identification unit 110 identifies a relative positional relation between or among two or more markers included in a single captured image by using a predetermined coordinate system. However, the identification unit 110 need not use a common coordinate system to identify the position of every marker in the plurality of capture images. In other words, the identification unit 110 need only identify a relative positional relation between or among two or more markers by using any coordinate system appropriate for describing coordinates of markers included in an imaging range.

For example, when a captured image includes two or more markers, the identification unit 110 identifies the marker whose identification information represents the smallest number, and, using the position of this marker as the origin of a coordinate system, identifies the positions of other markers relative to the marker serving as the origin. For example, the identification unit 110 defines an x-axis and a y-axis on a plane that includes a marker, and, using a predetermined position (such as the center or vertex) of the marker as the origin, expresses a positional relation between or among markers in a three-dimensional orthogonal coordinate system whose z-axis is orthogonal to the x-y plane. In this case, the position of the origin varies among captured images.

Now, letting $(x_1, y_1, z_1)$ be coordinates in a first coordinate system based on the viewpoint, or the imaging position, while $(x_2, y_2, z_2)$ be coordinates in a second coordinate system based on the position of a marker, these coordinate systems can be expressed vectorially by using a homogeneous transformation matrix, as in the following equation (1). In this homogeneous transformation matrix, the elements in three rows by three columns starting from the upper left of the matrix represent an attitude (rotation elements), while the elements in the fourth column ($m_{14}$, $m_{24}$, $m_{34}$) represent a position (translation elements). Specific values of the homogeneous transformation matrix vary among captured images, but are unique to each individual captured image.

[Equation 1]

$$\begin{pmatrix} x_1 \\ y_1 \\ z_1 \\ 1 \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \\ 0 & 0 & 0 & 1 \end{pmatrix} \begin{pmatrix} x_2 \\ y_2 \\ z_2 \\ 1 \end{pmatrix} \quad (1)$$

If a captured image includes a plurality of markers, the identification unit 110 can obtain a homogeneous transformation matrix for each of the markers. In addition, by using homogeneous transformation matrices for a plurality of markers based on a single imaging position, the identification unit 110 can obtain homogeneous transformation matrices based on the position (that is, the origin) of any one of the markers. For example, supposing that there are two markers having identification information "1" and "2", respectively, and letting $M_1$ and $M_2$ be their respective homogenous transformation matrices, the following equation (2) is established. In this equation, $M_{12}$ represents a homogenous transformation matrix indicating the position of the marker whose identification information is "2", relative to the position of the marker whose identification information is "1". In addition, $M_1^{-1}$ in the equation is an inverse matrix of the matrix $M_1$.

[Equation 2]

$$M_{12} = M_1^{-1} M_2 \quad (2)$$

When the position of the marker whose identification information is "1" is used as the reference, coordinates of the marker whose identification information is "2" are expressed by translation elements of the homogeneous transformation matrix $M_{12}$. Specifically, assuming that a value in the i-th row and the j-th column in a homogeneous transformation matrix $M_{12}$ is denoted as $M_{12}(i,j)$, coordinates of the marker whose identification information is "2" are expressed by the following equation (3):

[Equation 3]

$$x = M_{12}(1,4)$$

$$y = M_{12}(2,4)$$

$$z = M_{12}(3,4) \quad (3)$$

Note that a captured image may be directly supplied by the imaging means, or may be supplied to the storage means and stored for a while. The order in which the identification unit 110 identifies the coordinates information and identification information may or may not be the same as the order in which captured images are taken.

In addition, a captured image does not necessarily include all the disposed markers captured at a time in the space for which map data is to be generated (that is, all the markers may not necessarily be included in a single imaging range); rather, only some of the markers may be included in a single imaging range. However, in order to be used for generating map data, each marker needs to be included in at least one of captured images along with another marker.

The generation unit 120 generates map data, based on the marker positions and identification information, as identified by the identification unit 110 from each captured image. The generation unit 120 generates map data by using the identification information to transform coordinates of markers in different coordinate systems that depend on individual captured images into coordinates in a common coordinate system; in other words, the generation unit 120 transforms coordinates described in non-uniform coordinate systems into those in a common coordinate system.

Figure 2:
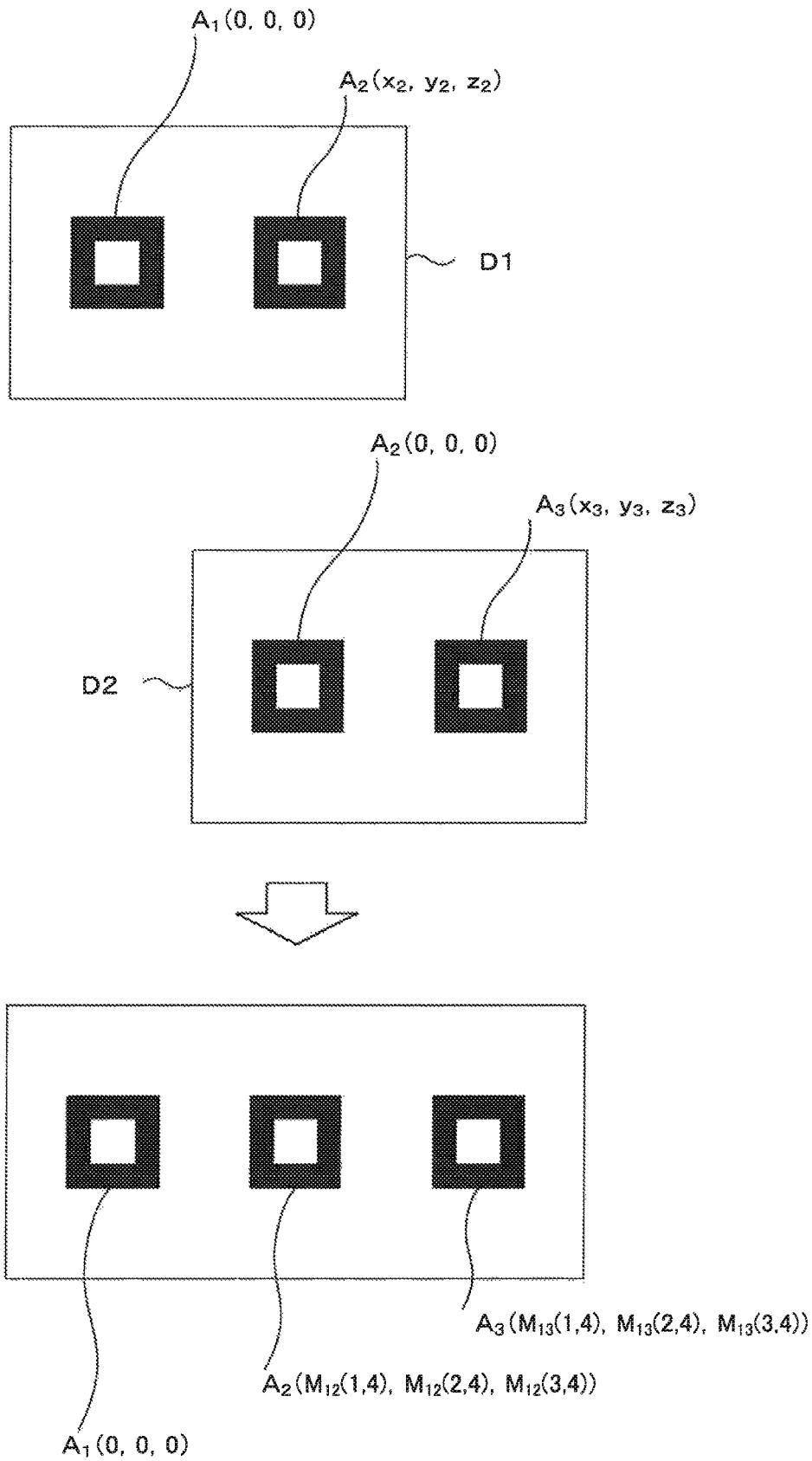
FIG. 2 illustrates coordinate transformations performed by a generation unit 120.

FIG. 2 illustrates coordinate transformations performed by the generation unit 120. In FIG. 2, image data D1, which represents a first captured image, includes markers $A_1$ and $A_2$. Coordinates of the markers $A_1$ and $A_2$ in the image data D1 can be expressed as (0, 0, 0) and ($x_2$, $y_2$, $z_2$), respectively, according to the foregoing equations (1) to (3). The image data D2, which represents a second captured image, includes markers $A_2$ and $A_3$, where a duplicate of the marker $A_2$ appears in the first captured image, while a duplicate of the marker $A_3$ does not appear in the first captured image. As in the first captured image, coordinates of the markers $A_2$ and $A_3$ can be expressed as (0, 0, 0) and ($x_3$, $y_3$, $z_3$), respectively.

Coordinates of the marker $A_2$ are different values between the image data D1 and the image data D2 because these two pieces of image data are in different coordinate systems. However, the generation unit 120 can recognize that these coordinates describe a single marker because these coordinates correspond to the same identification information. As long as a relative positional relation between these coordinate systems can be identified, the generation unit 120 can transform coordinates of the marker $A_3$ into those in a coordinate system in common with the image data D1, that is, the coordinate system with the marker $A_1$ serving as the origin.

To achieve this coordinate transformation, the generation unit 120 calculates the attitude of each marker. In the present example embodiment, the attitude of a marker is expressed in Euler angles. It is assumed here that the Euler angles are so-called Z-Y-X Euler angles representing rotation by γ, β, and α around the z-axis, the y-axis, and the x-axis, respectively in this order, but the Euler angles are not limited to such angles.

Given a homogeneous transformation matrix as expressed by the equation (1), the Euler angles are defined as in the following equation (4) by using inverse trigonometric functions. In this equation, a tan 2(y,x) represents an arctangent function for obtaining a deviation angle of a point (x,y) on a two-dimensional plane, falling in a range of −π≤a tan 2(y,x)<π. Then, the homogenous transformation matrix is expressed by the following equation (5) by using the Euler angles. Note that translation elements are 0 in the equation (5) for convenience of explanation.

[Equation 4]

$$\alpha = a\tan2(m_{32}, m_{33})$$
$$\beta = \arcsin(-m_{31})$$
$$\gamma = a\tan2(m_{21}, m_{11})$$
(4)

[Equation 5]

$$\begin{pmatrix} \cos\beta\cos\gamma & \cos\gamma\sin\alpha\sin\beta - \cos\alpha\sin\gamma & \cos\alpha\cos\gamma\sin\beta - \sin\alpha\sin\gamma & 0 \\ \cos\beta\sin\gamma & \cos\alpha\cos\gamma - \sin\alpha\sin\beta\sin\gamma & -\cos\gamma\sin\alpha + \cos\alpha\sin\beta\sin\gamma & 0 \\ -\sin\beta & \cos\beta\sin\alpha & \cos\alpha\cos\beta & 0 \\ 0 & 0 & 0 & 1 \end{pmatrix}$$
(5)

Now, letting $M_{13}$ be the homogenous transformation matrix describing coordinates of the marker $A_3$ in a coordinate system with its origin at the marker $A_1$, while letting $M_{23}$ be the homogeneous transformation matrix describing coordinates of the marker $A_3$ in a coordinate system with its origin at the marker $A_2$, the following equation (6) is established. In other words, the homogeneous transformation matrix $M_{13}$ can be expressed as a product of the homogenous transformation matrix $M_{12}$ as expressed by the equation (2) and the homogenous transformation matrix $M_{23}$. Note that the homogeneous transformation matrix $M_{23}$ can be calculated in the same way as for the homogenous transformation matrix $M_{12}$ calculated by using the equation (2).

[Equation 6]

$$M_{13} = M_{12} M_{23}$$
(6)

In addition, coordinates of the marker $A_3$ ($x_3$, $y_3$, $z_3$) can be expressed by the equation (7) in the same manner as in the equation (3).

[Equation 7]

$$x_3 = M_{13}(1,4)$$
$$y_3 = M_{13}(2,4)$$
$$z_3 = M_{13}(3,4)$$
(7)

That is, when a captured image includes a marker whose coordinates are known in a new coordinate system subjected to coordinate transformation, and also includes another marker whose coordinates are unknown in such coordinate system, the generation unit 120 can identify the coordinates of the marker, which are unknown in such coordinate system, by obtaining a product of homogenous transformation matrices. Therefore, even when a plurality of markers are imaged in such a way that they are (not included in a single captured image but) distributed among a plurality of captured images, the generation unit 120 can describe coordinates of the plurality of markers in a common coordinate system by repeating matrix operations.

Figure 3:
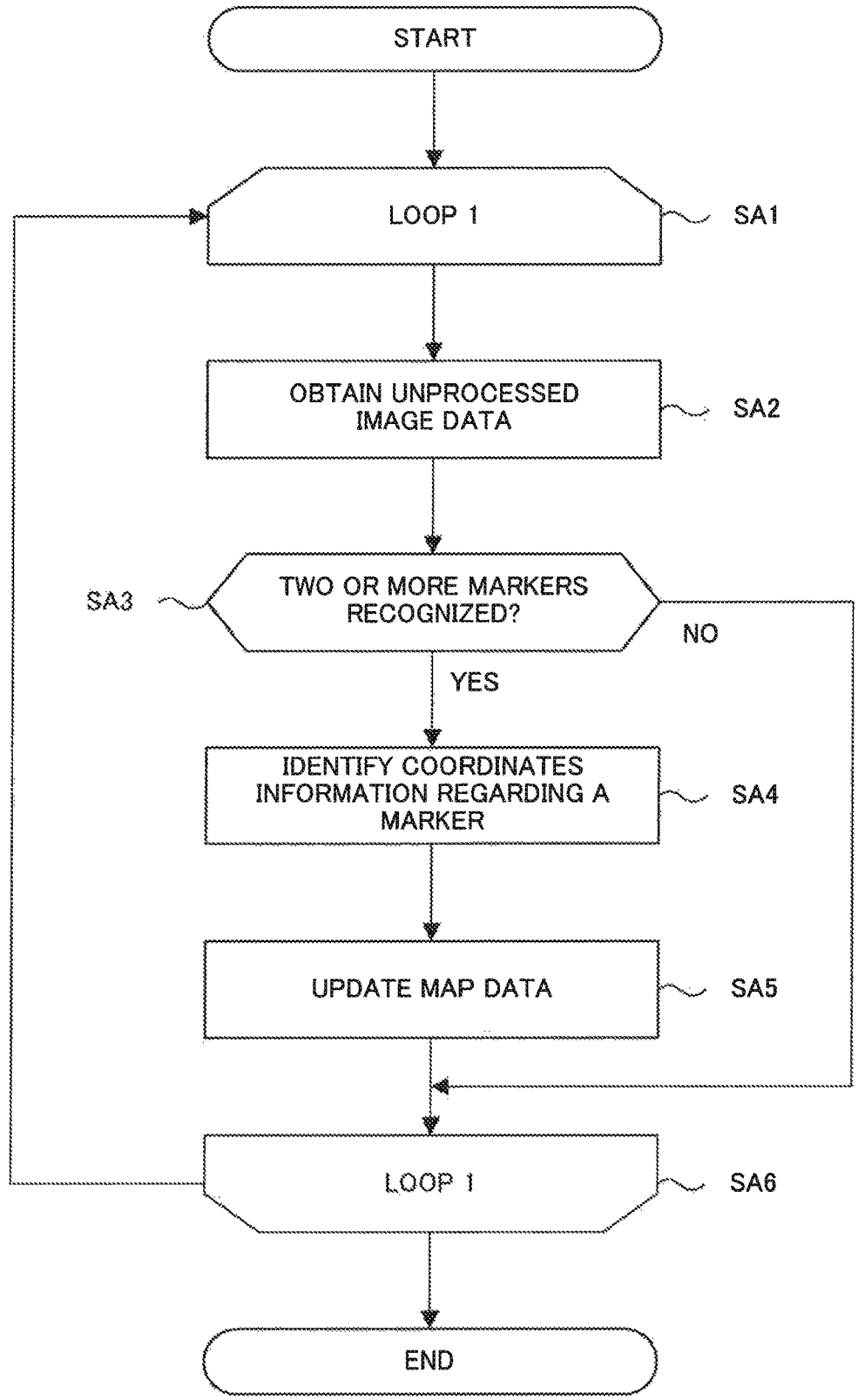
FIG. 3 is a flowchart illustrating example processes carried out by the map generation device 100.

FIG. 3 is a flowchart illustrating the map generation processing carried out by the map generation device 100. The map generation device 100 repeatedly executes processes in the loop indicated in steps SA1 to SA6 until a predetermined termination condition is satisfied. Examples of the termination condition may include that the imaging means has finished imaging, that all the prepared image data has been processed, or that a predetermined number of markers have been processed.

In step SA2, the identification unit 110 in the map generation device 100 obtains any piece of unprocessed image data. The identification unit 110 may sequentially read pieces of the image data stored in the storage means, or may suspend the processing until any image data is supplied from the imaging means.

Having obtained a piece of image data, the identification unit 110 determines whether two or more markers can be recognized in the obtained piece of image data (step SA3). If two or more markers cannot be recognized, in other words if the number of markers included in the captured image is either 0 or 1 (NO in step SA3), the identification unit 110 skips processes in steps SA4 and SA5, which are described below.

For example, if the image data D1 illustrated in FIG. 2 is obtained, the identification unit 110 can recognize the markers $A_1$ and $A_2$, and thus makes a positive determination in step SA3. In contrast, if either or both of the markers $A_1$ and $A_2$ are out of the imaging range or cannot be recognized correctly, the identification unit 110 makes a negative determination in step SA3.

If two or more markers are recognized (YES in step SA3), the identification unit 110 identifies coordinates information regarding each of the markers (step SA4). In this step, the identification unit 110 identifies a relative positional relation between or among the markers. Thus, the coordinates identified in this step need not be consistent with the coordinate system used for map data.

Next, the generation unit 120 updates the map data (step SA5). The updating of map data, as mentioned here, refers to addition of information (coordinates information and identification information) about a new marker to the map data. When the map data is in the initial state, that is, when the map data contains no information about markers, the generation unit 120 simply adds the coordinates information and identification information regarding the markers that have been handled for the first time in step SA4 to the map data. For example, if the image data D1 illustrated in FIG. 2 has been obtained, the generation unit 120 simply adds the coordinates information and identification information regarding the markers $A_1$ and $A_2$ to the map data.

In contrast, if the map data already includes information about any marker, that is, during the second or subsequent round of the loop processing, the generation unit 120 determines whether the map data contains any information about the marker whose identification information is the same as that of the marker that has just been recognized. If the map data contains information about such marker, the generation unit 120 further determines whether any of the markers that have just been recognized is missing in the map data, and, if any marker is missing in the map data, the generation unit 120 transforms the coordinates of the marker.

For example, supposing that the image data D1 illustrated in FIG. 2 was obtained, that the markers $A_1$ and $A_2$ were already added to the map data, and that the image data D2 has newly been obtained, the generation unit 120 determines whether the map data contains information about any of the markers $A_2$ and $A_3$, which are included in the image data D2. In this example, the marker $A_2$ is already added to the map data, and thus the generation unit 120 transforms the coordinates of the marker $A_3$ using the equations (6) and (7).

In case the information about a new marker fails to be added to the map data in step SA5, the generation unit 120 can temporarily save the information about the marker, and later add the information when it can be added to the map data. The failure to add the information about a new marker to the map occurs when the map data contains no identification information regarding any of the markers included in a captured image. Once identification information about at least one of the markers included in the captured image is added to the map data, information about other markers included in the capture image can be added to the map data.

The map generation device 100 can sequentially add information about a plurality of markers to the map data by repeating the loop processing from step SA1 to step SA6. Note that the map generation device 100 may move the origin of the coordinate system to any appropriate position after the loop processing is finished. In other words, the origin of map data is not limited to the position of the origin initially set in the map generation processing.

As seen above, according to the present example embodiment, with regard to a plurality of markers disposed in a predetermined space, a plurality of images are captured so that each image includes at least two of the markers, and, by using such plurality of captured images, map data can be generated in such a way that the plurality of markers are associated with one another. The user (or creator of the map) need only prepare a plurality of captured images each including at least two markers, without the need for high-resolution image data (that includes many more markers being identifiable).

In addition, according to the present example embodiment, coordinates information and identification information can be identified from markers, and thus the user need not enter such information. Accordingly, data input by the user for generating map data can be reduced. This effect is more noticeable as the number of markers is increased.

Example applications of the map data generated by the map generation device 100 include identifying positions of articles. For example, in the case where a lot of articles associated with markers are stored in a predetermined space, the map data generated by the map generation device 100 makes it possible to indicate or signify the position of a particular article.

Second Example Embodiment

Figure 4:
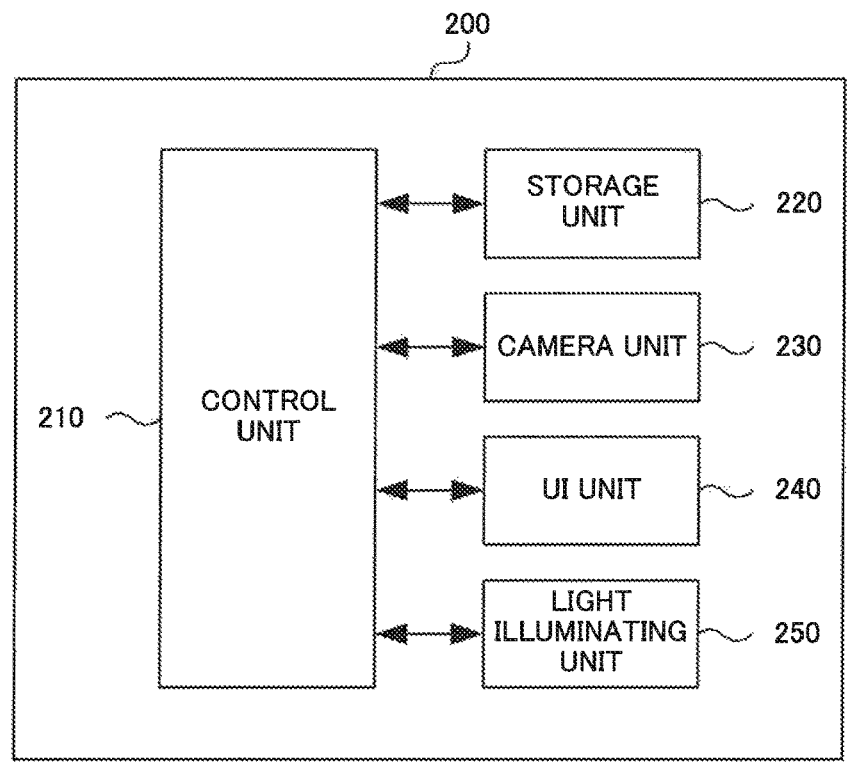
FIG. 4 is a block diagram illustrating an example hardware configuration of a picking support device 200.

FIG. 4 is a block diagram illustrating an example hardware configuration of a picking support device 200 according to the present example embodiment. The picking support device 200, which is an example of the above-described map generation device 100, is an information processing device intended to support picking operations performed by the user (operator). The picking support device 200 includes a control unit 210, a storage unit 220, a camera unit 230, a user interface (UI) unit 240, and a light illuminating unit 250.

The picking operation, as mentioned here, refers to finding and picking a target article from a plurality of articles (such as parts, materials, ingredients, or commodities) in a factory, warehouse, or any other workplace. Every article is uniquely associated with its own particular marker. Every marker is affixed or otherwise disposed at a specific position (for example, near its corresponding article). The picking support device 200 is mounted on, for example, a cart to be used by the user for picking and carrying articles in the workplace, and thus moves along with the user.

Figure 5:
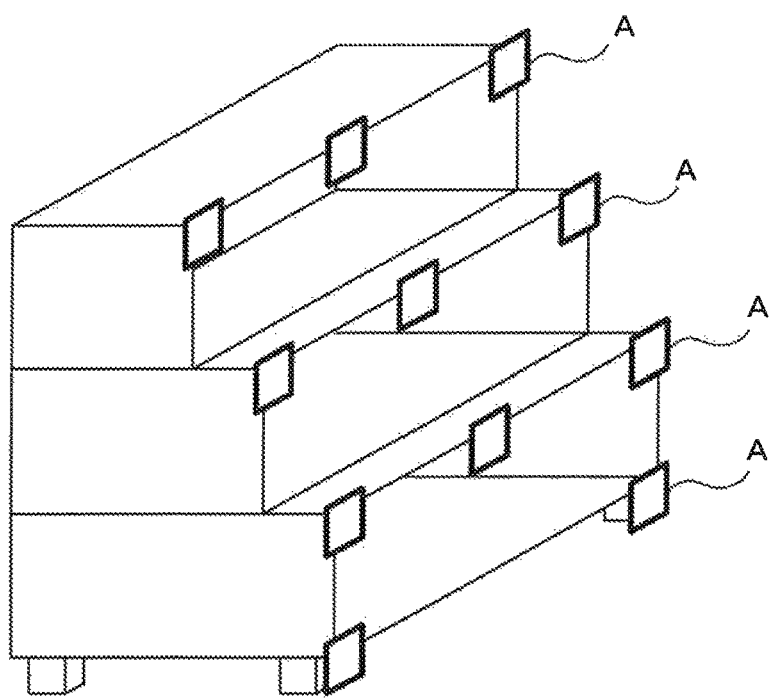
FIG. 5 illustrates an example of the state where markers are disposed.

FIG. 5 illustrates an example of the state where markers are disposed. In the present example embodiment, each individual article is stored in a predetermined place (section) on a shelf. Each article may be stored in a container, drawer, box, or the like, at a position visible or invisible from the user. A marker A is disposed in association with a place where an article is stored. Although the marker A is affixed on a shelf in this example, it may be affixed on a container or the like in which an article is stored, or may be affixed on a wall, not on a shelf. In addition, no specific limitation is imposed on the number or arrangement of markers A or of shelves. Furthermore, each shelf may have different faces through which the user puts an article and takes out the article.

Figure 6:
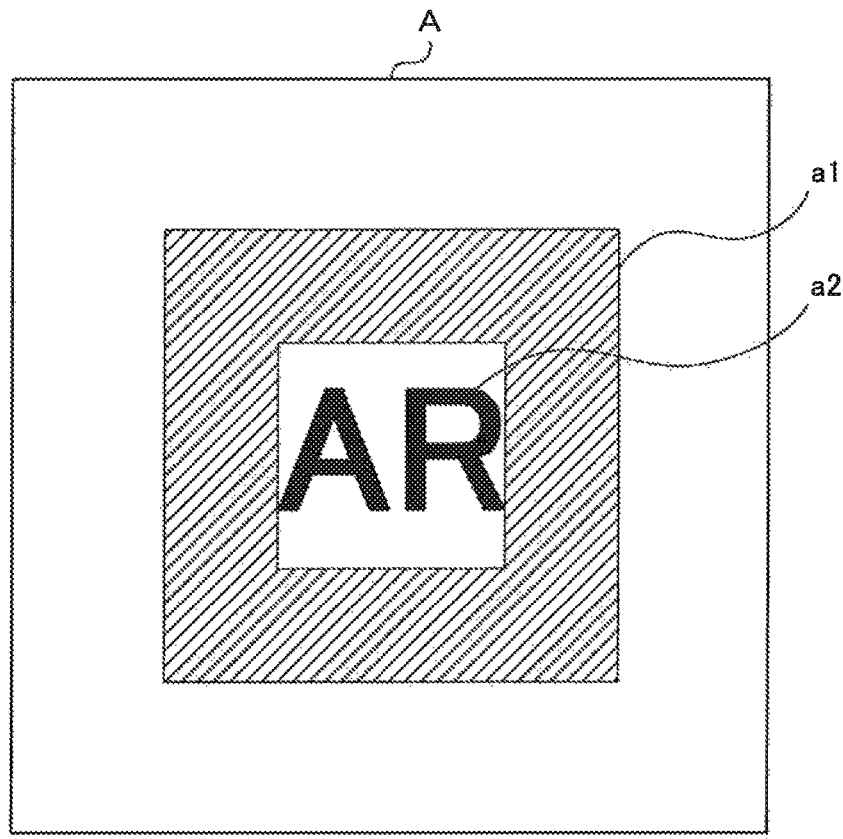
FIG. 6 illustrates an example marker.

FIG. 6 illustrates an example marker. In this example, the marker A is what is called an AR marker. The marker A may be in monochrome (black on white background) for ease of identification, or may be in multicolor for the purpose of using the colors as some information. The marker A includes a frame a1, which is in a predetermined shape, and an identification pattern a2, which is a visualization of identification information. In this example, the frame a1 is in a square of a predetermined size. The identification pattern a2 may be one or more characters or symbols, or may be a pattern composed of lines and/or dots arranged according to a predetermined rule.

Note that markers may not necessarily be associated with articles. In other words, some markers may be associated with particular articles and other markers may not be associated with articles. A marker that is not associated with an article may be used for generating map data, but may not be necessarily used as the signification target position for picking operations.

The control unit 210 controls operations of the individual units in the picking support device 200. The control unit 210, which includes an arithmetic processing unit such as a CPU and a memory serving as main memory, controls operations of the individual units by executing programs. For example, the control unit 210 is capable of controlling the imaging performed by the camera unit 230 and the information output performed by the UI unit 240. In addition, the control unit 210 carries out the map generation processing.

The storage unit 220 stores the data handled by the control unit 210. The storage unit 220 includes a storage medium such as a hard disk or a flash memory. The storage medium may be detachably attached to the picking support device 200, like a so-called memory card. Alternatively, the picking support device 200 may not be needed to include a storage medium itself, as long as the picking support device 200 includes a means for exchanging data with the storage medium.

The storage unit 220 is capable of storing, for example, programs and map data. In addition, the storage unit 220 stores the data (hereinafter called a "correspondence table") indicating association between identification information regarding articles (article names, article numbers, and the like) and identification information regarding markers. Before starting picking operations, the user prepares the correspondence table and registers the table with the picking support device 200.

The camera unit 230 takes images of markers. The camera unit 230 includes one or more image sensors. In the present example embodiment, the camera unit 230 is a digital video camera, that is, a means of taking videos; however, the camera unit 230 may be a digital still camera, that is, a means of taking still images. In the present example embodiment, each frame taken by the camera unit 230 is equivalent to a captured image. The camera unit 230 provides a frame rate of about 30 frames per second (fps), but the frame rate is not limited to a specific value. The camera unit 230 may include the zooming or rotating function so as to change the imaging range.

In generating map data, the camera unit 230 may not necessarily take images so that every image includes a plurality of markers. For example, in the case where the picking support device 200 takes videos while moving, some frames may possibly have an imaging range containing less than two markers. The picking support device 200 may discard such frame, if any, so that such frame is not used for generating map data.

The UI unit 240 gives and accepts information to and from the user. The UI unit 240 includes a display device such as a liquid crystal display, as an output means. Additionally, the UI unit 240 may be configured to include a speaker. The UI unit 240 may include a mouse or a keypad as an input means, or may include a touch screen display serving as both an input means and an output means.

The light illuminating unit 250 emits a light so as to signify a position to the user. The light illuminating unit 250 includes a light source, such as a light emitting diode (LED) collimator illuminator that narrows incoherent light and emits it in the form of a beam, as well as including a driving means (for example, a camera platform or a motor) that moves or rotates the light source to change the direction of light emission. More specifically, the light illuminating unit 250 emits a light toward or around a marker (including the position where an article is stored).

The picking support device 200 is configured as above. The user can use the picking support device 200 configured in this manner for picking operations. The picking support device 200 has a first function and second function, where the first function is to generate map data, and the second function is to signify the position of an article based on the generated map data. The first function, which is used before picking operations, is a function performed at a preparation stage so that the second function can be fulfilled. Later, the second function is used during picking operations.

Figure 7:
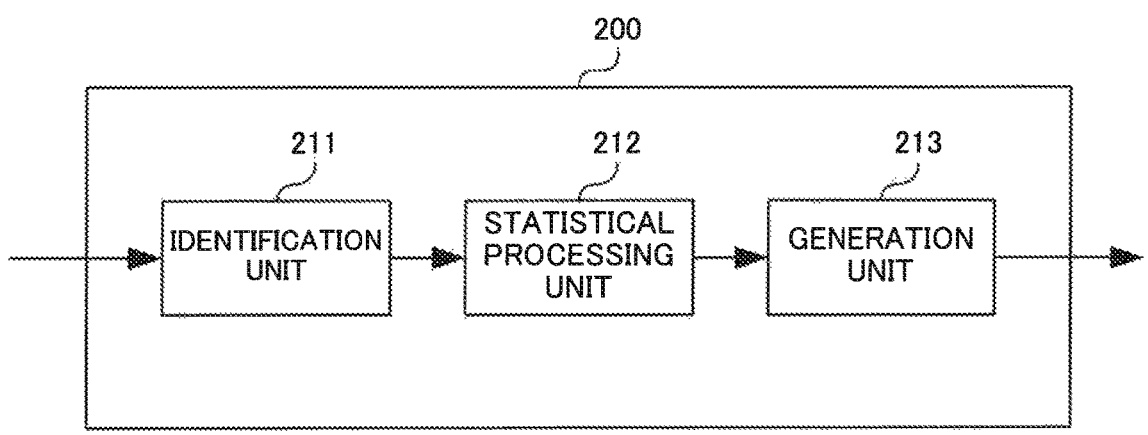
FIG. 7 is a block diagram illustrating a functional configuration of the picking support device 200.

FIG. 7 is a block diagram illustrating a functional configuration for the first function of the picking support device 200. In the picking support device 200, the functions equivalent to an identification unit 211, a statistical processing unit 212, and a generation unit 213 are implemented through execution of a predetermined program performed by the control unit 210. Note that functions of the identification unit 211 and the generation unit 213 are similar to those of the identification unit 110 and the generation unit 120, respectively, according to the first example embodiment. The identification unit 211 obtains image data taken by the camera unit 230 and identifies three-dimensional coordinates of a marker and identification information regarding the marker. The generation unit 213 generates map data and stores it into the storage unit 220.

The statistical processing unit 212 performs statistical processing on the coordinates information or the identification information identified by the identification unit 211. The statistical processing, as mentioned here, refers to analyzing a plurality of numerical values identified by the identification unit 211, and sorting out some values if necessary. For example, the statistical processing unit 212 discards any identification information having misidentification or any coordinates information having a superposed error. In this case, the generation unit 213 generates map data excluding any value discarded by the statistical processing unit 212. The statistical processing unit 212 is capable of discarding identification information having misidentification and coordinates information having a superposed error by, for example, using the Kalman filter or particle filters. Additionally, by utilizing the feature that the same marker repeatedly appears in a plurality of frames of captured images, the statistical processing unit 212 may discard the identification information or coordinates information regarding a certain marker that appears relatively infrequently in the frames.

As in the first example embodiment, the present example embodiment can be carried out with a configuration that does not include the statistical processing unit 212. However, with the statistical processing unit 212, the map data can be made more accurate due to reduction in the influence of conditions (brightness, for example) under which the camera unit 230 captures images or of occlusion of part of a marker caused by another object (a person) appearing in the mage.

The map generation processing according to the present example embodiment is the same as that of the first example embodiment (see FIG. 3). However, in addition to the processes in FIG. 3, the picking support device 200 may carry out the process of discarding any identification information having misidentification or any coordinates information having a superposed error. Furthermore, if a plurality of captured images include the same marker, as determined by the identification information, the picking support device 200 may use only one of such plurality of captured images to identify the coordinates of the marker. Alternatively, if a plurality of captured images include the same marker, as determined by the identification information, the picking support device 200 may identify the coordinates of each of the markers in the captures images and use their average or median value to generate map data.

Note that the picking support device 200 may carry out the map generation processing while the camera unit 230 is capturing images, or may perform the processing after the camera unit 230 finishes capturing images, that is, after all the marker images are taken. Additionally, if any information regarding a marker is discarded, the picking support device 200 may prompt the camera unit 230, through the UI unit 240, to capture the image again.

The picking support device 200 may use any one of the positions of markers as the origin of map data, or may use a predetermined position in a space as the origin of map data. Furthermore, the picking support device 200 may accept an input given by the user specifying an origin.

Figure 8:
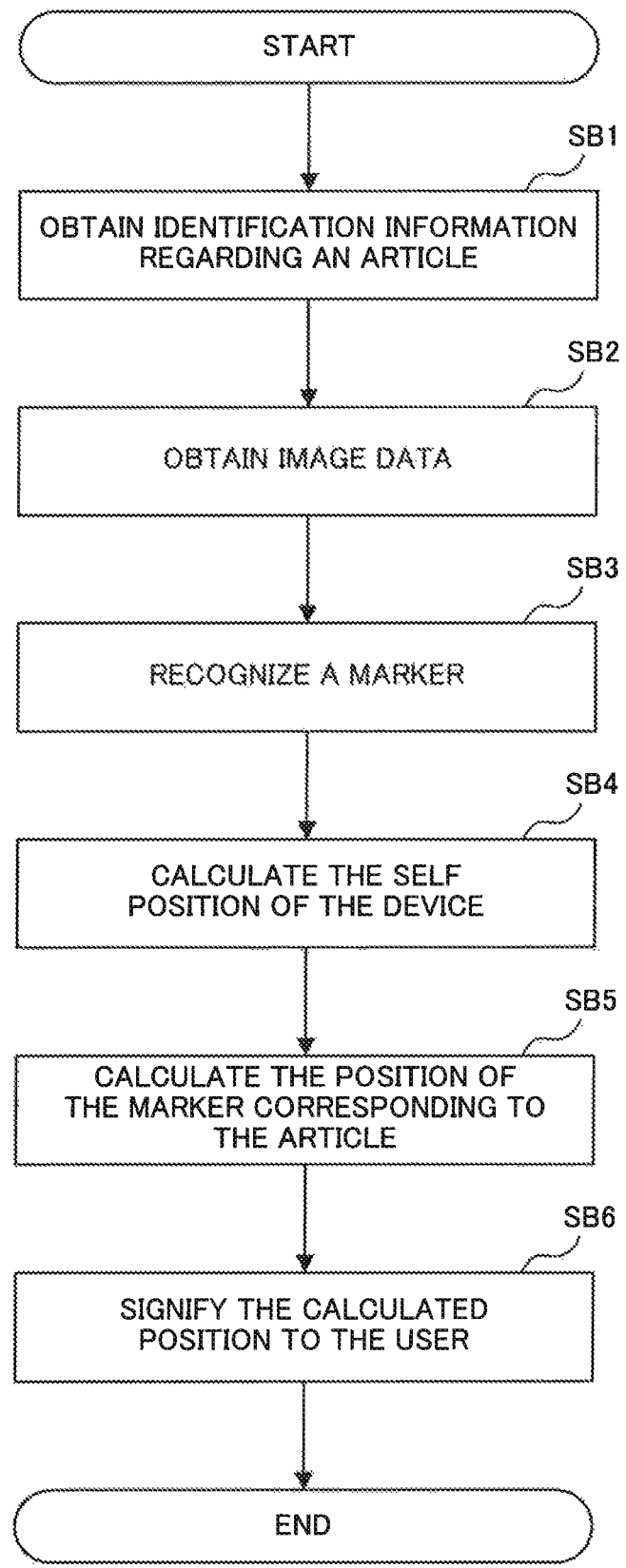
FIG. 8 is a flowchart illustrating example processes carried out by the picking support device 200.

FIG. 8 is a flowchart illustrating the processing for the second function. During picking operations, the user enters identification information regarding an article to be picked. In response to an input given by the user, the control unit 210 in the picking support device 200 performs the processes shown in FIG. 8. It is assumed here that the control unit 210 can identify correspondence relations between articles and markers according to the above-described correspondence table and that map data has already been generated.

The control unit 210 obtains identification information regarding an article through the UI unit 240 (step SB1). The control unit 210 also obtains image data from the camera unit 230 (step SB2). The control unit 210 may cause images to be taken upon obtainment of the identification information regarding an article, or may cause images to be taken continuously during picking operations.

The control unit 210 recognizes one or more markers in the image data (step SB3). If one or more markers cannot be recognized in the image data, the control unit 210 changes the imaging range until any marker is recognized. The control unit 210 changes the imaging range by changing at least one of the position, direction, and magnification of imaging. Note that the user can also change the imaging range by moving the picking support device 200 or changing the magnification.

Upon recognition of a marker in the image data, the control unit 210 calculates the self position of the device (step SB4). The control unit 210 can calculate the relative positional relation between the device and a marker, based on the size and shape of the marker. When doing this calculation, the control unit 210 compares the position of the recognized marker with the map data, thereby being able to identify the self position expressed in coordinates in the coordinate system of the map data.

If more than one marker is recognized in the image data, the control unit 210 may use these markers to calculate their corresponding values of coordinates of the device, and may use an average or median value of the calculated coordinates as the coordinates of the device. Alternatively, the control unit 210 may calculate the coordinates of the device by using the marker closest to the device, or may assign weights that depend on the distance between the device and the marker to the coordinates calculated by using the individual markers, and then calculate an average value of the weighted coordinates. These methods may be used because a marker closer to the device is believed to involve fewer errors.

Having calculated the self position of the device, the control unit 210 calculates the position of the marker corresponding to the identification information obtained in step SB1, that is, the identification information regarding the article to be picked (step SB5). The control unit 210 refers to the correspondence table to identify the marker corresponding to the article to be picked, and identifies the position of the marker using the map data. Furthermore, the picking support device 200 calculates the position of the marker relative to the self position of the device.

Then, the picking support device 200 signifies the position calculated in step SB5 to the user (step SB6). For example, the picking support device 200 may display, on the UI unit 240, the map on which the self position of the device and the marker position are identified to show the user the position, or the route to the position, of the marker corresponding to the article to be picked, or may guide the user to the marker position by voice.

Alternatively, the picking support device 200 may cast a light at the marker corresponding to the article to be picked. The picking support device 200 can illuminate the marker corresponding to the article to be picked even when the marker is out of an imaging range of the camera unit 230. In addition, even when the picking support device 200 is moving, the device can cast a light to the target position, based on the device's current position after movement, by repeatedly performing the processes in steps SB1 to SB6.

Having picked the target article, the user enters the identification information regarding an article to be picked next. Upon accepting an input of identification information regarding an article, the picking support device 200 performs the processes in steps SB1 to SB6 again. The user repeats entering identification information regarding an article until all the necessary articles are picked.

As seen above, according to the present example embodiment, not only generating map data but also aiding the user in picking articles through the use of map data can be achieved. The user can recognize the position of a stored article, which is signified by a sound, light, or image.

Third Example Embodiment

The present example embodiment is a variation of the above-described second example embodiment. The present example embodiment is similar to the second example embodiment with regard to an overall configuration, but differs from the second example embodiment in the functions implemented by the picking support device 200 (in particular, functions related to the map generation processing). Note that symbols given in the present example embodiment identical to those in the second example embodiment represent the same components described above in the second example embodiment. In the present example embodiment, descriptions of the matters in common with the second example embodiment are omitted.

Figure 9:
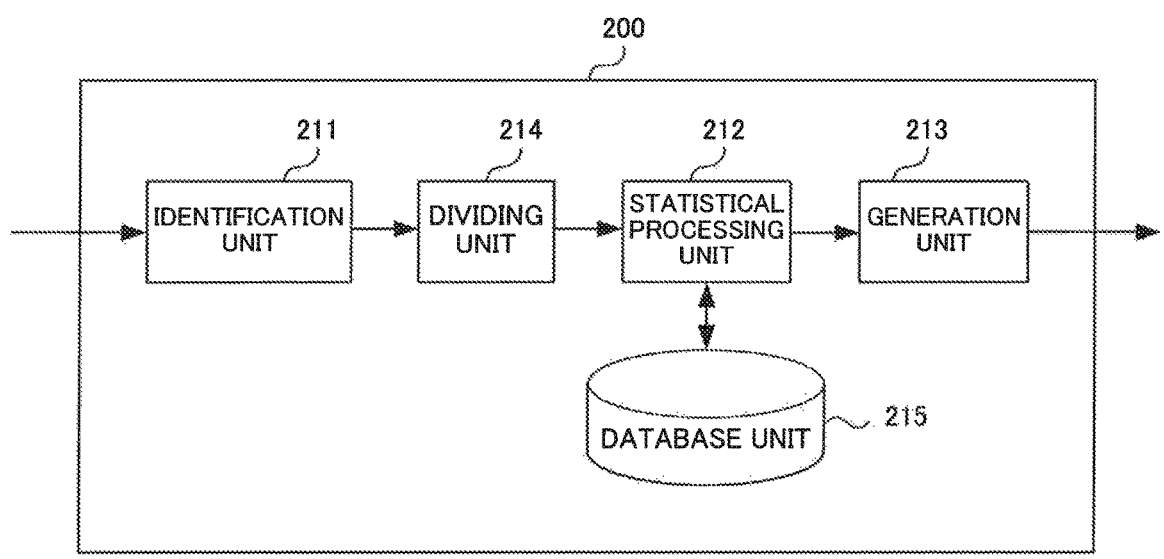
FIG. 9 is a block diagram illustrating an example functional configuration of the picking support device 200.

FIG. 9 is a block diagram illustrating a functional configuration for the first function of the picking support device 200. In the picking support device 200, in addition to the functions of the identification unit 211, the statistical processing unit 212, and the generation unit 213, the functions equivalent to a dividing unit 214 and a database unit 215 are implemented through execution of a predetermined program performed by the control unit 210.

If a captured image includes three or more markers, the dividing unit 214 divides a combination of the markers to define a plurality of pairs. The dividing unit 214 turns three or more markers included in a captured image into pairs, each of which is composed of adjacent markers. Adjacent markers, as mentioned here, means two successive markers along a direction, the two markers being a combination (pair) of markers with no other marker included in between seen in the direction. The coordinates and the identification information regarding a pair are hereinafter collectively called "pair data". Pair data is stored in the database unit 215.

The statistical processing unit 212 is the same as in the second example embodiment in that it performs statistical processing, but differs from that of the second example embodiment in that the statistical processing is performed on pair data. More specifically, the statistical processing unit 212 of the present example embodiment serves as a means for calculating a reliability of a pair of markers. The statistical processing unit 212 stores each piece of pair data into the database unit 215 and, if necessary, reads the piece of pair data to calculate its reliability. The generation unit 213 differs from that of the second example embodiment in that map data is generated by using the reliability calculated by the statistical processing unit 212.

Figure 10:
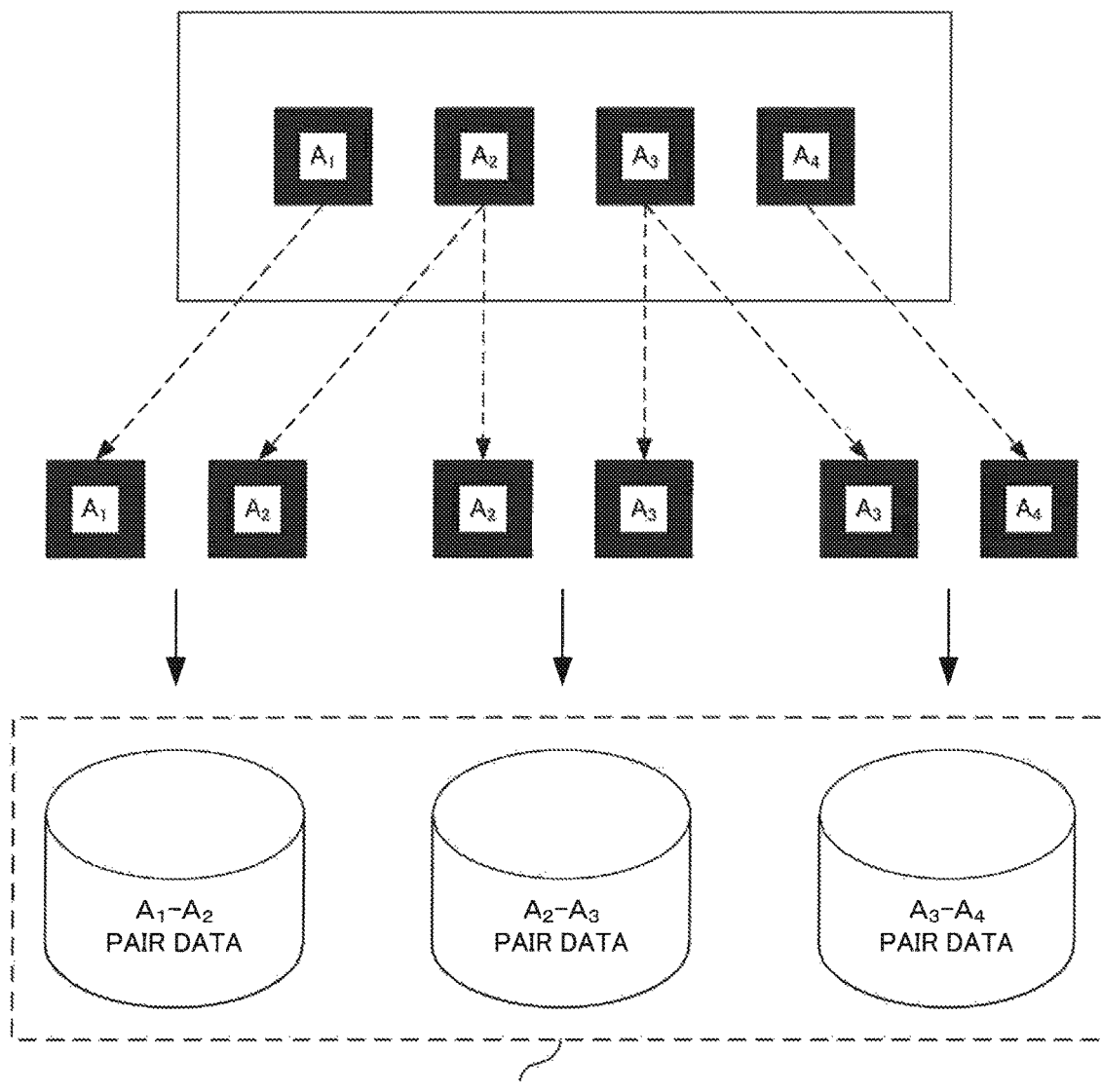
FIG. 10 is an explanatory diagram illustrating a pair of markers.

FIG. 10 is an explanatory diagram illustrating a pair of markers according to the present example embodiment. Although in this example markers are arranged along a single direction for convenience of explanation, markers may be arranged along a plurality of directions and marker pairs may be defined along such plurality of directions.

Supposing that a single captured image includes markers $A_1, A_2, A_3$, and $A_4$ as illustrated in FIG. 10, the dividing unit 214 divides these markers into three pairs of markers: $A_1$-$A_2$, $A_2$-$A_3$, and $A_3$-$A_4$. The database unit 215 stores pair data on each of these pairs. More than one piece of pair data may exist for the same pair. For example, when the same pair is included in a plurality of captured images, a plurality of pieces of pair data about the same pair are recorded in the database unit 215.

Figure 11:
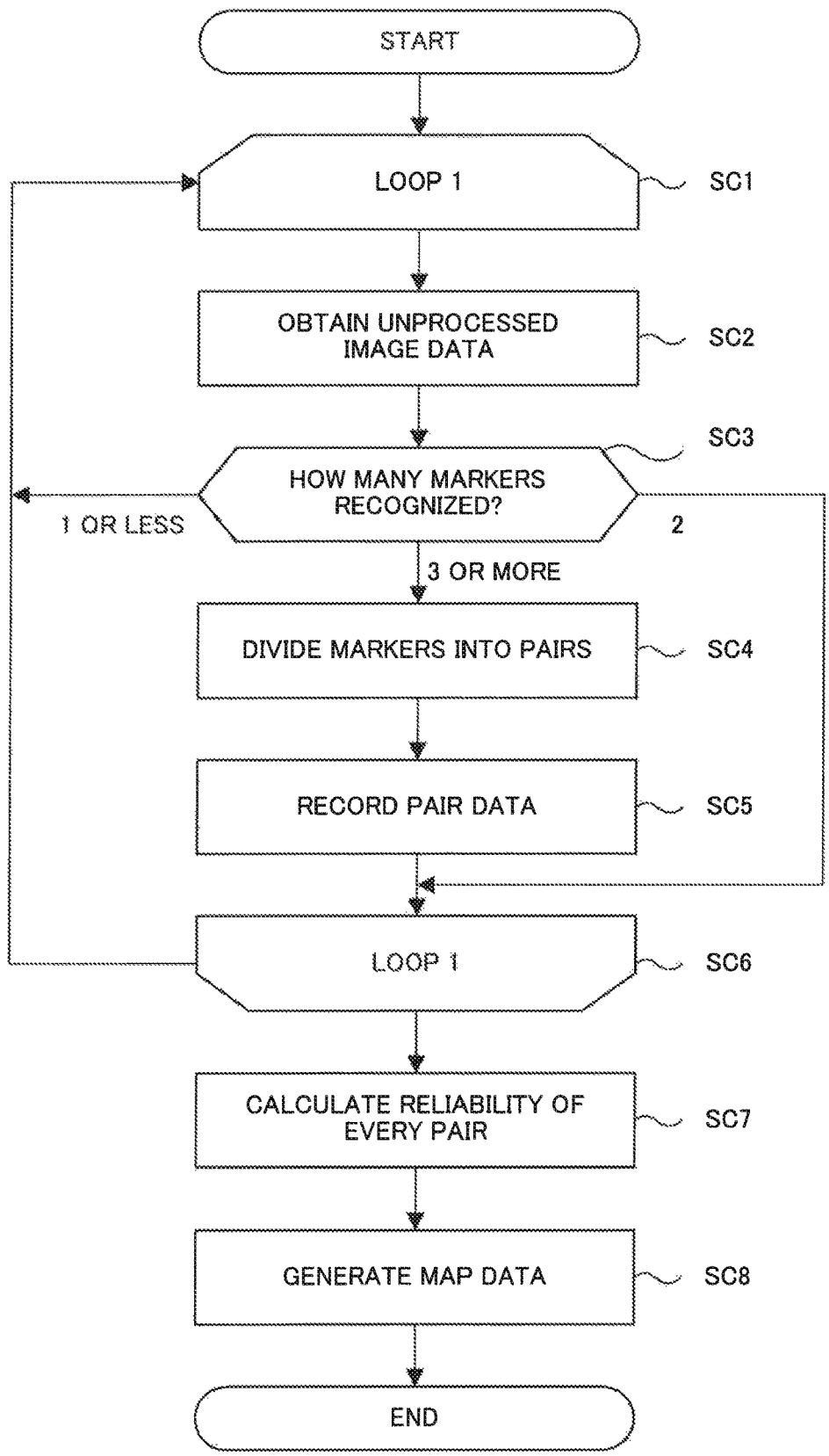
FIG. 11 is a flowchart illustrating example processes carried out by the picking support device 200.

FIG. 11 is a flowchart illustrating map generation processing. The picking support device 200 repeatedly executes processes in the loop indicated in steps SC1 to SC6 until a predetermined termination condition is satisfied. Examples of the termination condition may include that pair data about a predetermined number of markers has been recorded, or that the loop processing has been repeated a predetermined number of times or for a predetermined time period. Alternatively, the picking support device 200 may terminate the loop processing in response to an operation by the user.

In step SC2, the identification unit 211 in the picking support device 200 obtains any piece of unprocessed image data. Next, the identification unit 211 recognizes any marker in the image data that was obtained in step SC2 and determines the number of recognized markers (step SC3). Specifically, the identification unit 211 performs different processes that depend on the number of recognized markers: one or less, two, or three or more.

In the case where three or more markers were recognized in step SC3, the dividing unit 214 divides the markers into a plurality of pairs (step SC4). In the case where two markers were recognized in step SC3, the captured image is deemed to include only one pair of markers. In this case, the dividing unit 214 skips the process in step SC4. In the case where one or less marker was recognized in step SC3, the dividing unit 214 skips the processes in steps SC4 and SC5.

In step SC5, the dividing unit 214 identifies coordinates of markers constituting a pair and records the pair data. When generating a plurality of pieces of pair data from the same image data, the dividing unit 214 may use different coordinate systems for those pieces of pair data. For example, with respect to each piece of pair data, the dividing unit 214 uses the position of one particular marker included in the pair data as the origin, and calculates coordinates based on the origin's positional relation to the other marker. To record pair data on the same pair subsequently, the dividing unit 214 uses the position of the particular one marker as the origin.

When the loop processing is repeated until a termination condition is satisfied, the statistical processing unit 212 calculates a reliability of every pair (step SC7). The reliability may be, for example, the reciprocal of the standard deviation of coordinates information (position and attitude) regarding markers constituting a pair. The reliability is a smaller (lower) value as there is a greater amount of variability of coordinates information between or among a plurality of pieces of pair data. In other words, the reliability is a greater (higher) value as the coordinates of markers constituting a pair contain fewer errors. The statistical processing unit 212 need not calculate the reliability of a pair if the database unit does not contain a plurality of pieces of pair data on the pair.

When reliabilities of all the pairs have been calculated, the generation unit 213 generates map data (step SC8). When generating the map data, the generation unit 213 preferentially use a pair having a higher reliability level. Specifically, the generation unit 213 starts with adding the most reliable pair to map data. In this step, when two or more sets of coordinates of the same pair are identified, the generation unit 213 uses their average values as the coordinates. Concerning any pair whose reliability is below a predetermined threshold or whose reliability cannot be calculated, the generation unit 213 need not add the coordinates information regarding this pair to the map data.

As seen above, according to the present example embodiment, reliabilities can be evaluated during map data generation by making a pair of adjacent markers and identifying the positional relation between the markers. Therefore, according to the present example embodiment, more accurate map data can be provided by preferentially using a pair having a higher reliability.

(Variations)

The present invention can be carried out according to an embodiment different from the above-described example embodiments. For example, the following variations can be applied to the present invention. In addition, the present invention can be carried out by using any combination of these example embodiments and variations or by replacing part of these example embodiments and variations with another part thereof.

(1) Variation 1

The picking support device 200 may use the number of identifications of a pair as the reliability of the pair. For example, a pair generated through incorrect recognition of identification information regarding markers is likely to be identified less frequently than pairs generated otherwise. In contrast, a pair that is more often identified, that is, a pair of markers whose images are more often captured, is expected to provide the positional relation being more accurately identified. Hence, the statistical processing unit 214 gives a higher reliability to a pair that has been more frequently identified as the same pair.

For example, the generation unit 213 may generate map data without using any pair whose reliability is less than a predetermined threshold. Alternatively, the generation unit 213 may generate map data only using those pairs whose number of identifications is among the top 80%, or those pairs whose number of identifications accounts for 10% or higher of the highest number of identifications of a pair.

(2) Variation 2

The picking support device 200 may determine the order of adding pairs to map data in accordance with the number of identifications of a pair. For example, the generation unit 214 may preferentially add a pair that has been more often identified to the map data.

FIG. 12 illustrates an example list of pairs and their numbers of identifications (the list is hereinafter called a "descending order list"). The descending order list ranks pairs of markers from the highest number of identifications (that is, listed in the descending order). The descending order list also includes a list of addition flags indicating whether the pair has been added to the map data. The picking support device 200 stores such descending order list in the storage unit 220 and updates the list when the map data is updated. Note that the marker $A_x$ in this example represents a marker whose identification information has been incorrectly recognized.

Figure 13:
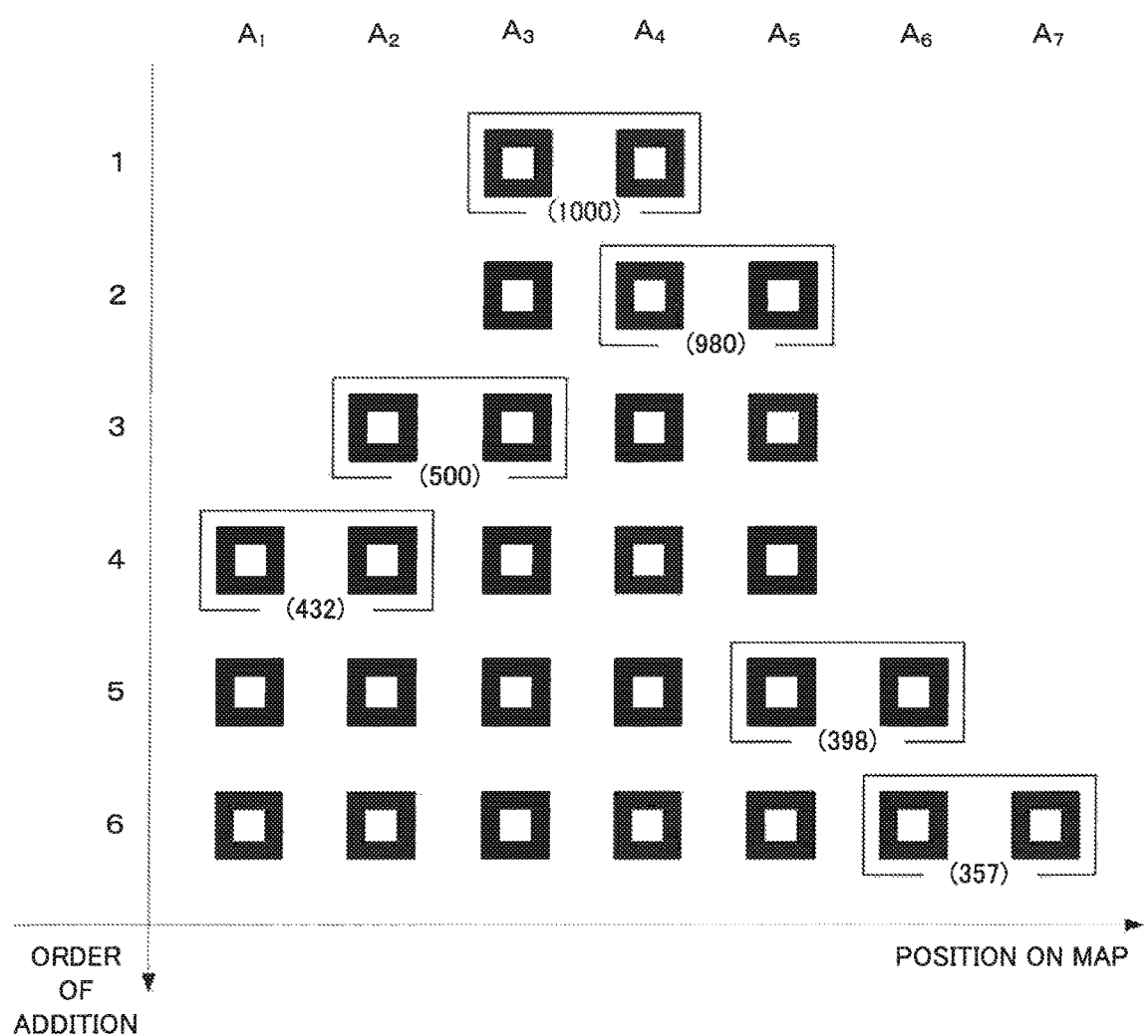
FIG. 13 illustrates an example order of adding pairs to map data.

FIG. 13 illustrates an example order of adding pairs to the map data. If the descending order list as illustrated in FIG. 12 is stored, the generation unit 213 adds pairs to the map data in the order shown in FIG. 13. The generation unit 213 starts with adding the pair having the largest number of identifications to the map data. In the example in FIG. 13, the pair of markers $A_3$-$A_4$ has the largest number of identifications. Having added the pair of markers $A_3$-$A_4$ to the map data, the generation unit 213 changes the addition flag corresponding to the pair from "0" to "1".

Next, the generation unit 213 refers to the descending order list and searches the list for any pair that has the addition flag set to "0" and contains a marker that is already added to the map data. In other words, the generation unit 213 searches for a pair composed of a marker that has already been added to the map data and a marker that has not been added to the map data. When two or more pairs match the search criteria, the generation unit 213 gives a higher priority to the pair having the larger number of identifications and adds the pair to the map data first.

Referring now to FIG. 13, it is seen that any pair that includes either marker $A_3$ or marker $A_4$ can be added to the map data following the pair $A_3$-$A_4$. That is, either the pair of markers $A_2$-$A_3$ or the pair of markers $A_4$-$A_5$ can be subsequently added to the map data. According to the descending order list, the generation unit 213 first adds the pair of markers $A_4$-$A_5$, which has a greater number of identifications, to the map data.

After the generation unit 213 adds the pair of markers $A_4$-$A_5$, any pair that includes either marker $A_3$ or marker $A_5$ can now be added to the map data. That is, either the pair of markers $A_2$-$A_3$ or the pair of markers $A_5$-$A_6$ can be subsequently added to the map data. According to the descending order list, the generation unit 213 first adds the pair of markers $A_2$-$A_3$, which has a greater number of identifications, to the map data.

After that, the generation unit 213 sequentially adds markers $A_1$ to $A_7$ in the same manner as described above. Note that this example assumes that the generation unit 213 adds any pair that has the number of identifications equal to or greater than a predetermined threshold ("100" in the example) to the map data. Thus, pairs having the number of identifications less than 100 are not added to the map data in this example.

As seen above, the picking support device 200 can make map data highly accurate by using the descending order list, compared with the case where markers are added to the map data irrespective of the number of identifications of a pair.

(3) Variation 3

The picking support device 200 may generate map data excluding any outlier in pair data. The outlier, as mentioned here, means a piece of pair data on the same pair as recorded in the database unit 215, the piece of pair data having values of coordinates or attitude (x, y, z, $\alpha$, $\beta$, $\gamma$) that are significantly different from those of other pieces of the pair data. The picking support device 200 can identify an outlier by, for example, using the standard deviation.

Figure 14:
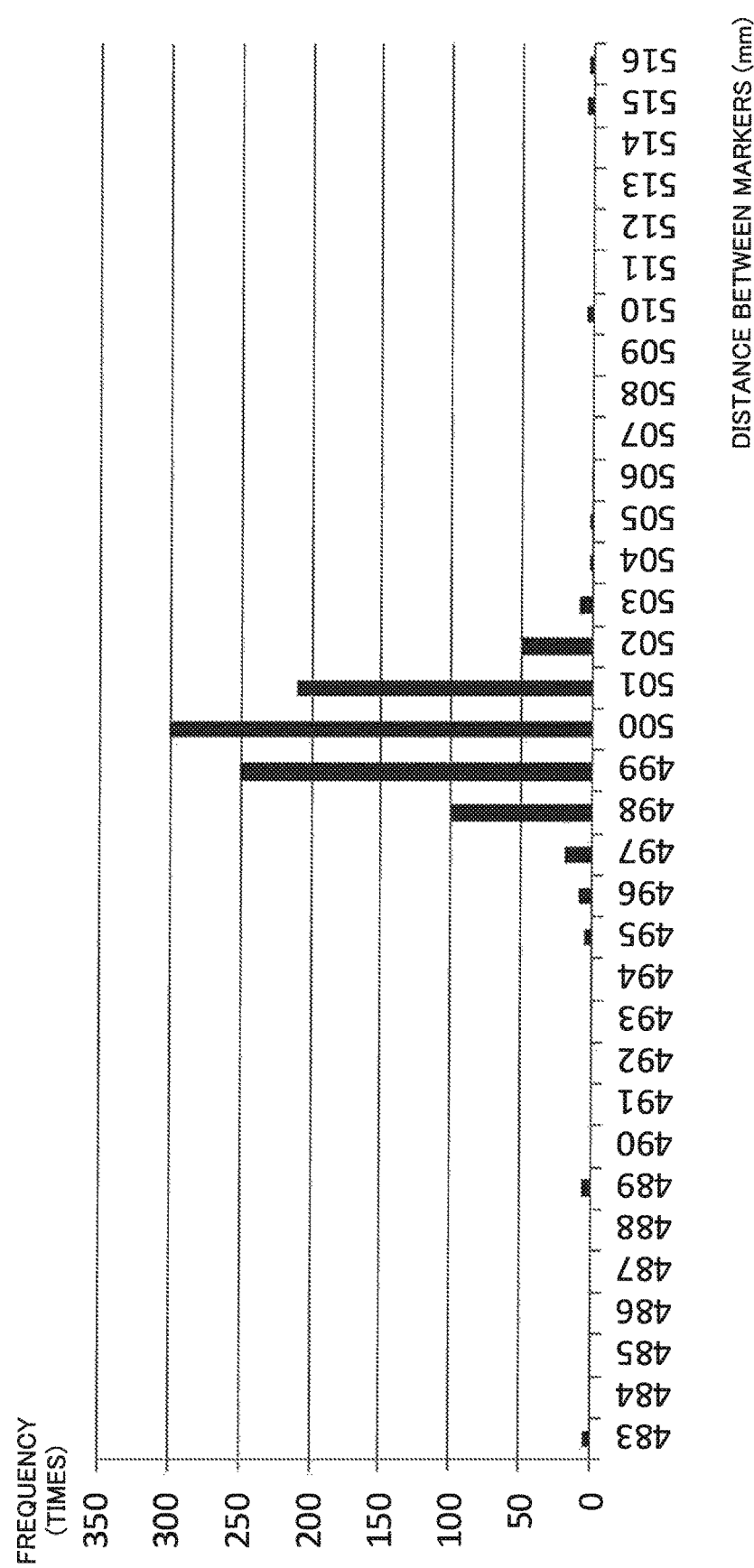
FIG. 14 is an example histogram of pair data.

FIG. 14 shows an example histogram of certain pair data. The histogram shows, using the position of one of the markers as the reference, or as the origin, the distribution of the x element of the other marker. In this example, the true value of the x element is 500 mm, which matches the mode value. However, some values in FIG. 14 are significantly distant from the true value. Such values may have been generated because the identification information was incorrectly recognized for another pair that was actually recognized, or because a significant accidental error was caused by a disturbance or a blurred image.

To calculate an average value of the x element, the statistical processing unit 212 excludes, for example, the values distributed in the top 25% or the bottom 25%, and only uses the values in the remaining 50% close to the mode value. In this case, out of 1,000 recorded pieces of pair data, for example, the statistical processing unit 212 uses only 500 pieces to calculate an average value.

(4) Variation 4

Markers according to the present invention may be rewritable. For example, a marker according to the present invention may be a display device like what is called electronic paper, or may contain information recorded with a rewritable recording material such as a leuco dye. Additionally, a marker according to the present invention may be in a three-dimensional form relative to the imaging direction so that irregularities on the surface represent information.

(5) Variation 5

As an imaging means according to the present invention, what is called a stereo camera or a range imaging camera may be used. The range imaging camera, as mentioned here, refers to an imaging means capable of measuring a depth (distance) of the subject included in a captured image. Examples of a measuring method employed in a range imaging camera include the time of flight (TOF) method. With such an imaging means, coordinates information regarding the distance from the imaging position can be obtained more easily.

(6) Variation 6

Neither the map generation device 100 nor the picking support device 200 has any specific limitation imposed on its shape or appearance. For example, the picking support device 200 may be a wearable device configured to be worn on the user, rather than mounted on a cart. Specifically, the picking support device 200 may be in the form of a head-mounted display (HMD). Alternatively, the picking support device 200 may include a projector as a display means so that information about the article to be picked can be projected near the article. In this case, the picking support device 200 may make areas other than the article to be picked less bright.

The picking support device 200 may also include a robot arm with which an article is picked and the position of an article is signified. The picking support device 200 may further include an automatic running function to travel and perform picking operations automatically (that is, eliminate the need for user intervention).

Instead of including the light illuminating unit 250, the picking support device 200 may include a means for communicating with a signification device (a lamp or the like) that is disposed near a marker or article. In this case, the picking support device 200 communicates with the signification device corresponding to the target article to activate the signification device.

The picking support device 200 may be implemented through collaboration among a plurality of devices. For example, while some components of the picking support device 200 may be mounted on a cart, other components may be implemented by a server device or the like that is connected thereto via a network. The picking support device 200 may also include different devices configured for the first function and the second function, respectively.

(7) Variation 7

The present invention is not limited to the embodiments in the form of a device like the map generation device 100 or the picking support device 200. The present invention can be provided in the form of a method for generating map data as described above with one or more devices, or in the form of a program (or a recording medium recording the program) that can be executed by a computer.

The present application claims priority based on Japanese Patent Application No. 2015-080164 filed on Apr. 9, 2015, the entire disclosure of which is incorporated herein.

REFERENCE SIGNS LIST

100 Map generation device
110 Identification unit
120 Generation unit
200 Picking support device
210 Control unit
211 Identification unit
212 Statistical processing unit
213 Generation unit 220 Storage unit
230 Camera unit
240 UI unit
250 Light illuminating unit

The invention claimed is:

1. A map generation device comprising:
at least one memory storing instructions; and
at least one processor executing the instructions to perform:
identifying, by using a plurality of captured images each of which includes two or more markers, relative positions of the two or more markers in a three-dimensional manner, the two or more makers being disposed at different positions from one another; and
transforming different coordinates system of the plurality of captured images into a common coordinate system based on the identified relative positions of the two or more markers; and
generating map data in which relative positional relation of a plurality of markers are associated with identification information of the plurality of markers,
wherein each of the plurality of markers is included in at least one of the captured images, wherein
when the captured image includes three or more markers, the at least one processor performs:
identifying a plurality of different pieces of coordinates information regarding every pair of adjacent markers, based on a plurality of captured images that are different in imaging position or imaging direction;
calculating a reliability of the every pair by using the same pair; and
generating the map data using the calculated reliability.

2. The map generation device according to claim 1,
wherein the at least one processor transforms each of coordinates that are identified from two captured images that include a marker appearing in both of the images and a marker appearing in either of the images into a coordinate in the common coordinate system.

3. The map generation device according to claim 2,
wherein the at least one processor transforms coordinates of a marker whose coordinates are unknown in the common coordinate system, the marker being identified from a captured image that includes the marker whose coordinates are unknown and a marker whose coordinates are known in the common coordinate system, into coordinates in the common coordinate system, based on a positional relation relative to the marker whose coordinates are known.

4. The map generation device according to claim 1,
wherein the at least one processor identifies a plurality of pieces of coordinates information with respect to a single marker, based on a plurality of captured images that are different in imaging position or imaging direction,
wherein the at least one processor further performs statistical processing on the identified coordinates information or identification information, and
wherein the at least one processor generates the map data using a result of the statistical processing.

5. The map generation device according to claim 1,
wherein the at least one processor uses how many times the same pair is identified as the reliability.

6. The map generation device according to claim 1,
wherein the captured image is part of a video recorded at a predetermined frame rate.

7. A map generation method comprising:
at least one memory storing instructions; and
at least one processor executing the instructions to perform:
identifying, by using a plurality of captured images each of which includes two or more markers, relative positions of the two or more markers in a three-dimensional manner, the two or more makers being disposed at different positions from one another; and
transforming different coordinates system of the plurality of captured images into a common coordinate system based on the identified relative positions of the two or more markers, and
generating map data in which relative positional relation of a plurality of markers are associated with identification information of the plurality of markers,
wherein each of the plurality of markers is included in at least one of the captured images, wherein
when the captured image includes three or more markers, the at least one processor performs:
identifying a plurality of different pieces of coordinates information regarding every pair of adjacent markers, based on a plurality of captured images that are different in imaging position or imaging direction;
calculating a reliability of the every pair by using the same pair; and
generating the map data using the calculated reliability.

8. A non-transient program recording medium recording a program that causes a computer to execute the processing of:
identifying, by using a plurality of captured images each of which includes two or more markers, relative positions of the two or more markers in a three-dimensional manner, the two or more makers being disposed at different positions from one another; and
transforming different coordinates system of the plurality of captured images into a common coordinate system based on the identified relative positions of the two or more markers, and
generating map data in which relative positional relation of a plurality of markers are associated with identification information of the plurality of markers,
wherein each of the plurality of markers is included in at least one of the captured images, wherein
when the captured image includes three or more markers, the processing further comprising:
identifying a plurality of different pieces of coordinates information regarding every pair of adjacent markers, based on a plurality of captured images that are different in imaging position or imaging direction;
calculating a reliability of the every pair by using the same pair; and
generating the map data using the calculated reliability.

* * * * *